(12) United States Patent
Adler

(10) Patent No.: US 8,011,169 B2
(45) Date of Patent: Sep. 6, 2011

(54) METHOD OF SEALING AN END FIN OF A CARTON

(75) Inventor: Peter Nils Adler, Asker (NO)

(73) Assignee: Elopak Systems AG, Glattbrug (CH)

(*) Notice: Subject to any disclaimer, the term of this patent is extended or adjusted under 35 U.S.C. 154(b) by 183 days.

(21) Appl. No.: 12/310,637

(22) PCT Filed: Aug. 30, 2007

(86) PCT No.: PCT/GB2007/003299
§ 371 (c)(1), (2), (4) Date: Mar. 2, 2009

(87) PCT Pub. No.: WO2008/025996
PCT Pub. Date: Mar. 6, 2008

(65) Prior Publication Data
US 2010/0236197 A1    Sep. 23, 2010

(30) Foreign Application Priority Data
Aug. 30, 2006 (GB) .................................. 0617030.2

(51) Int. Cl.
*B65B 51/10* (2006.01)
(52) U.S. Cl. .......... 53/371.2; 53/477; 53/484; 53/373.7; 53/374.2
(58) Field of Classification Search ............ 53/477, 53/484, 486, 370.7, 371.2, 371.8, 373.7, 53/374.2, 374.6, 374.8
See application file for complete search history.

(56) References Cited

U.S. PATENT DOCUMENTS

| | | | | |
|---|---|---|---|---|
| 5,067,302 A | * | 11/1991 | Boeckmann | 53/374.8 |
| 5,214,905 A | * | 6/1993 | Wyberg | 53/477 |
| 5,713,181 A | * | 2/1998 | Giacomelli | 53/371.2 |
| 5,890,347 A | * | 4/1999 | Giacomelli et al. | 53/477 |
| 5,976,315 A | * | 11/1999 | Martin | 156/580.2 |
| 6,482,291 B1 | * | 11/2002 | Kume et al. | 156/580.2 |
| 6,986,232 B1 | * | 1/2006 | Kume et al. | 53/371.2 |
| 7,219,483 B2 | * | 5/2007 | Adair et al. | 53/451 |

* cited by examiner

*Primary Examiner* — Hemant M Desai
(74) *Attorney, Agent, or Firm* — Warn Partners, P.C.

(57) ABSTRACT

An ultrasonic sealing device for a top fin of a gable-topped carton includes two jaws consisting of a jaw (2) with a planar active face and constituting the outer end portion of an ultrasonic horn (A1) and a jaw (6) constituting an anvil and having an active surface (10) which is planar except for upper and lower linear ribs (12) and (14) each extending the length of the surface (10). The lower rib (14) is linear and horizontal except for an upwardly bowed middle portion (16). The two jaws (2) and (6) serve to render gas-and-liquid tight a top fin of a conventional, plastics-coated paperboard, gable-top carton. The ribs (12) and (14) produce, in the outer surface of one of the outer sealing panels of the fin, corresponding furrows which extend over the whole length of the fin at levels where the inner sealing panels are sandwiched between the outer sealing panels, so as to seal the top fin in a gas- and liquid-tight manner along its whole length.

16 Claims, 2 Drawing Sheets

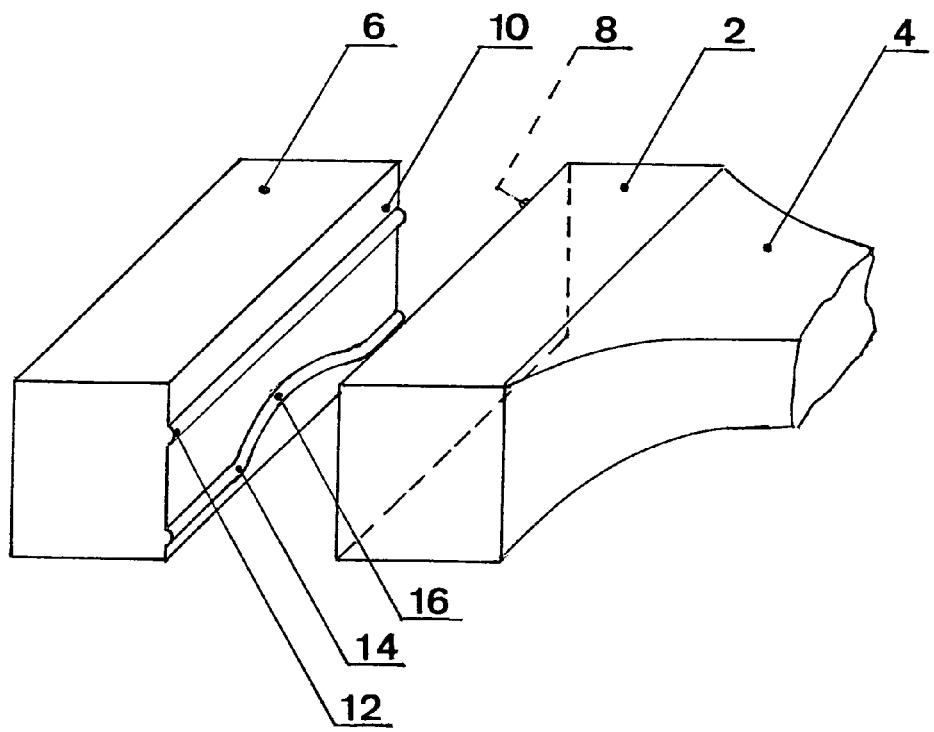
Fig. 1
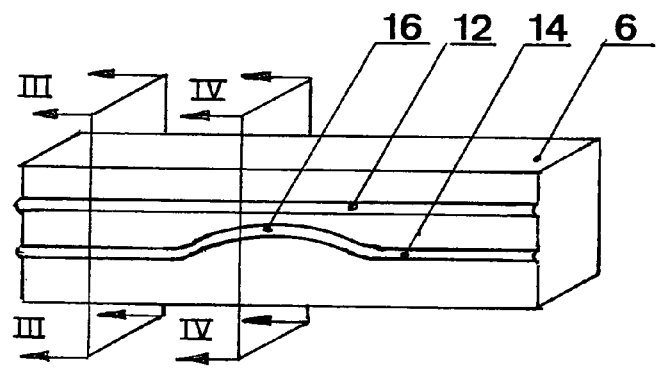
Fig. 2
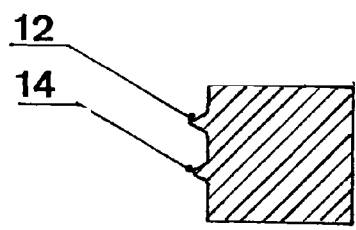 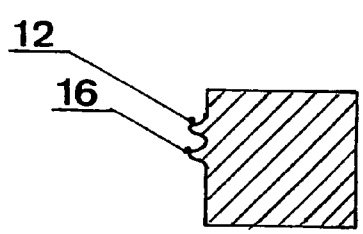
Fig. 3        Fig. 4

METHOD OF SEALING AN END FIN OF A CARTON

This application is a National Stage of International Application No. PCT/GB2007/003299, filed Aug. 30, 2007. This application claims priority to Great Britain Patent Application No. GB 0617030.2 filed on Aug. 30, 2006. The disclosures of the above applications are incorporated herein by reference.

This invention relates to a sealing jaw, a method of using the jaw and a carton sealed by the jaw.

It is known to use a pair of sealing jaws in sealing of an end fin of a plastics-coated paperboard carton, which fin comprises two outer sealing panels and two inner sealing panels which are sandwiched between the outer sealing panels and each folded upon itself and which are so disposed between the outer sealing panels as to produce an undesired central incipient channel bounded by the outer sealing panels and inwardly folded edges of the respective inner sealing panels.

At the inner end of that channel, the inner sealing panels are directly connected to triangular obturating panels at locations where the folding of the carton wall material tends to product weaknesses, particularly in relation to gas- and liquid-tightness. In respect of gable-top cartons, until provision of pour spout fitments thereon became accepted, there was always the problem of trying to achieve two contradictory aims, namely ease of opening (without cutting implements) and gas- and liquid-tightness. The incipient channel mentioned above raised a particular difficulty in that, if it was well sealed, neat folding-out of one of the inner sealing panels in forming a pouring spout was almost impossible.

Various ways of endeavouring to seal that channel against leakage therethrough of liquid contents of the carton (and/or of air or moisture into the carton) are known.

JP-A-1199845 discloses a method wherein a circular impression for preventing contents from leaking through such channel in a gable top carton is formed at the lengthwise centre of at least one side of the fin, the impression extending over both a mainly two-ply upper part of the fin and a mainly four-ply lower part of the fin. One of the pair of sealing jaws has its active face formed with a discontinuous horizontal protrusion extending from end-to-end of the jaw but in two lengths joined by a circular protrusion at the lengthwise centre of the jaw. A zig-zag protrusion extends downwardly from a top portion of the circular protrusion to a lower portion thereof. Three vertical protrusions at the end zones of the active face extend downwards from the horizontal protrusion to the bottom edge of that face. There are two vertical protrusions in one end zone and only one in the opposite end zone, thus indicating that the gable top is to have its inner sealing panel at the latter end zone unfoldable in forming a pouring spout. The active face of the other jaw is formed with depressions corresponding in shape to the circular protrusion and its zig-zag diametrical protrusion. The lower half of the active face of each jaw is set back to allow for the transition from mainly two-ply to mainly four-ply thickness of the fin. The horizontal protrusion is at substantially the level of that transition. The forming of the circular and zig-zag impressions so produced in the fin is intended to encourage flow of internal plastics of the fin into the channel to seal it against leakage therethrough. Another possibility is disclosed in which the circular and zig-zag protrusions and depressions are omitted, the horizontal protrusion is continuous from end-to-end of the relevant jaw and the active face of that jaw is formed centrally of the length thereof with two short horizontal protrusions one above the other but both below the end-to-end horizontal protrusion.

U.S. Pat. No. 5,242,701 discloses a method for the shelf-stable packaging of perishable liquid food products in hermetically sealed, easy-to-open, gable top cartons, in which the cartons are sealed over certain critical areas of their top fins while sealing pressure over certain other specific areas is reduced or relieved. The active face of one of the pair of jaws has a continuous horizontal protrusion and vertical protrusions corresponding to those of JP-A-1199845 but also has a small central protrusion to form a stake point at the incipient channel itself. Again, the active faces of both jaws have lower parts set back to allow for the transition from mainly two-ply to mainly four-ply thickness of the fin, but additionally have those lower parts recessed to achieve the reduction or relieving of sealing pressure at the other specific areas.

WO-A-95/17300 discloses a gable top carton which has a stake seal having spaced apart legs disposed longitudinally on opposite sides of the incipient channel formed when the carton blank is folded to form the gable top carton. Production of the spaced apart legs is intended to urge the material at the sides of the channel towards the centre of the channel to effect a seal of channel. The stake seal may be in the form of an inverted U-shaped stake seal. The active face of one jaw has a planar upper part and a set-back lower part from which projects the protrusion to form the stake seal and also three vertical protrusions, two in one end zone and one in the opposite end zone, thus indicating that one of the inner sealing panels is to be unfolded in forming a pouring spout.

WO-A-99/17991 discloses a method of ultrasonically sealing the top of a gable top carton to form a top fin. In the method a seal is effected by a first pair of jaws to produce a first sealing pattern and, after effecting of the first sealing pattern, a second pair of jaws produces a second sealing pattern. One jaw of each pair is an anvil and the other jaw is an ultrasonic horn. The active face of each anvil is planar and the active face of each horn is formed with one or more elongate, rectilinear protrusions to produce the desired sealing patterns. In one embodiment, the final sealing pattern consists of a horizontal seal along the two-ply thickness of the fin, a horizontal seal along the upper part of the four-ply thickness of the fin, and another horizontal seal along the lower part of the four-ply thickness but interrupted the zone of the potential channel. In another embodiment, the uppermost and the lowermost seals are joined by vertical seals at ends thereof.

WO-A-01/81070 discloses a sealing device for a packaging laminate of, for example, an aluminium foil carrying an outer layer of polyethylene terephthalate and an inner layer of polyethylene. The folded-over laminate is sandwiched between sealing bars of a linear sealing device and narrower than the sealing width, with the inner layers to be sealed to each other being in a heated state, and subsequently a surface sealing device sandwiches the linearly-sealed, folded-over laminate with sealing bars of a width appropriate for sealing over the sealing width, the layers to be sealed being pressed together in a melting state.

According to one aspect of the present invention, there is provided a jaw for use in sealing of an end fin of a packaging carton, which fin comprises first and second outer sealing panels and first and second inner sealing panels which are sandwiched between said outer sealing panels and each folded upon itself and which are so disposed between said outer sealing panels as to produce a central incipient channel bounded by said outer sealing panels and inwardly folded edges of the respective inner sealing panels, said jaw comprising a sealing rib extending longitudinally of an active face of said jaw and including a bowed middle portion, the arrangement being such that, during the sealing, the bowing of said middle portion is away from the middle of the carton, there being substantially no sealing protrusions to that side of said rib which, during the sealing, is towards the middle of the carton.

Advantageously, the jaw comprises, to that side of the rib which, during the sealing, is away from the middle of the carton, a second sealing rib extending longitudinally of the active face and closely adjacent to the bowed middle portion of the first rib. Preferably, the second sealing rib is substantially co-extensive with the first rib longitudinally thereof and is rectilinear. The jaw may particularly be an anvil for bearing pressure produced by an ultrasonic sealing horn for the fin.

According to another aspect of the present invention, there is provided a method of sealing an end fin of a packaging carton, which fin comprises first and second outer sealing panels and first and second inner sealing panels which are sandwiched between said outer sealing panels and each folded upon itself and which are so disposed between said outer sealing panels as to produce a central incipient channel bounded by said outer sealing panels and inwardly folded edges of the respective inner sealing panels, comprising temporarily clamping said fin between sealing jaws and thereby forming, along said fin, a line of pressure and thereby a seal among said outer sealing panels and said inner sealing panels including a middle portion bowed away from the middle of the carton, thereby promoting closure of said central incipient channel, the degree of sealing pressure produced by said clamping being greater than any produced by said jaws at any location between said line and the middle of said carton.

Advantageously, the method further comprises, simultaneously with the forming of the line of pressure, forming along the fin a second line of pressure extending closely adjacent to the first line of pressure and also among the outer sealing panels and the inner sealing panels. The second line of pressure is to that side of the first line of pressure away from the middle of the carton and is preferably rectilinear and formed co-extensively with the first line of pressure. The present method is particularly suitable for ultrasonic sealing of the fin, especially if the or each line of pressure is produced by forming of a correspondingly shaped furrow in an outer surface of one of the outer sealing panels by a correspondingly shaped rib on an anvil co-operating with an ultrasonic horn.

According to a further aspect of the present invention, there is provided a packaging carton including an end fin comprising first and second outer sealing panels and first and second inner sealing panels which are sandwiched between said outer sealing panels and each folded upon itself and which are so disposed between said outer sealing panels as to produce a central incipient channel bounded by said outer sealing panels and inwardly folded edges of the respective inner sealing panels, and a linear seal formed among said outer sealing panels and said inner sealing panels and including a middle portion bowed away from the middle of the carton, whereby closure of said central incipient channel has been promoted, sealing tightness per unit area at said linear seal being greater than at any location between said linear seal and the middle of said carton.

Advantageously, a second linear seal is formed, among the outer sealing panels and the inner sealing panels, along the fin and extends closely adjacent to the first linear seal and to that side of the first linear seal away from the middle of the carton. Preferably, the second linear seal is co-extensive with the first linear seal longitudinally thereof and is rectilinear.

Owing to the present invention, it is possible to provide a seal extending over substantially the whole length of the fin and yet to arrange that the middle portion thereof which promotes closure of the central incipient channel is relatively significantly spaced away from the inner end of that channel, where the inner sealing panels may be directly connected to triangular obturating panels at locations where the folding of the carton wall material tends to produce weaknesses, particularly in relation to gas- and liquid-tightness, which could be exacerbated by application of a sealing stake, e.g. a rib, immediately adjacent thereto.

Particularly advantageously, there is disposed closely outwards of the rib or furrow in question another rib or furrow which extends longitudinally of the jaw or fin, as the case may be, and which has the effect of providing a barrier against outward movement of material of the carton at the incipient channel and thus further promotes closure of the incipient channel between the first-mentioned rib or furrow, as the case may be, and the second-mentioned rib or furrow.

Use of ultrasonic sealing is particularly preferred. Provision of the rib(s) on the anvil instead of on the ultrasonic horn is recommended.

In order that the invention may be clearly and completely disclosed, reference will now be made, by way of example, to the accompanying drawings, in which:—

FIG. 1 is an isometric perspective view of two jaws of an ultrasonic sealing device for a top fin of a gable-topped carton;

FIG. 2 is an isometric perspective view of one of the jaws of FIG. 1;

FIG. 3 shows a cross-section taken on the plane III-III of FIG. 2;

FIG. 4 shows a cross-section taken on the plane IV-IV of FIG. 2; and

Figure 5:
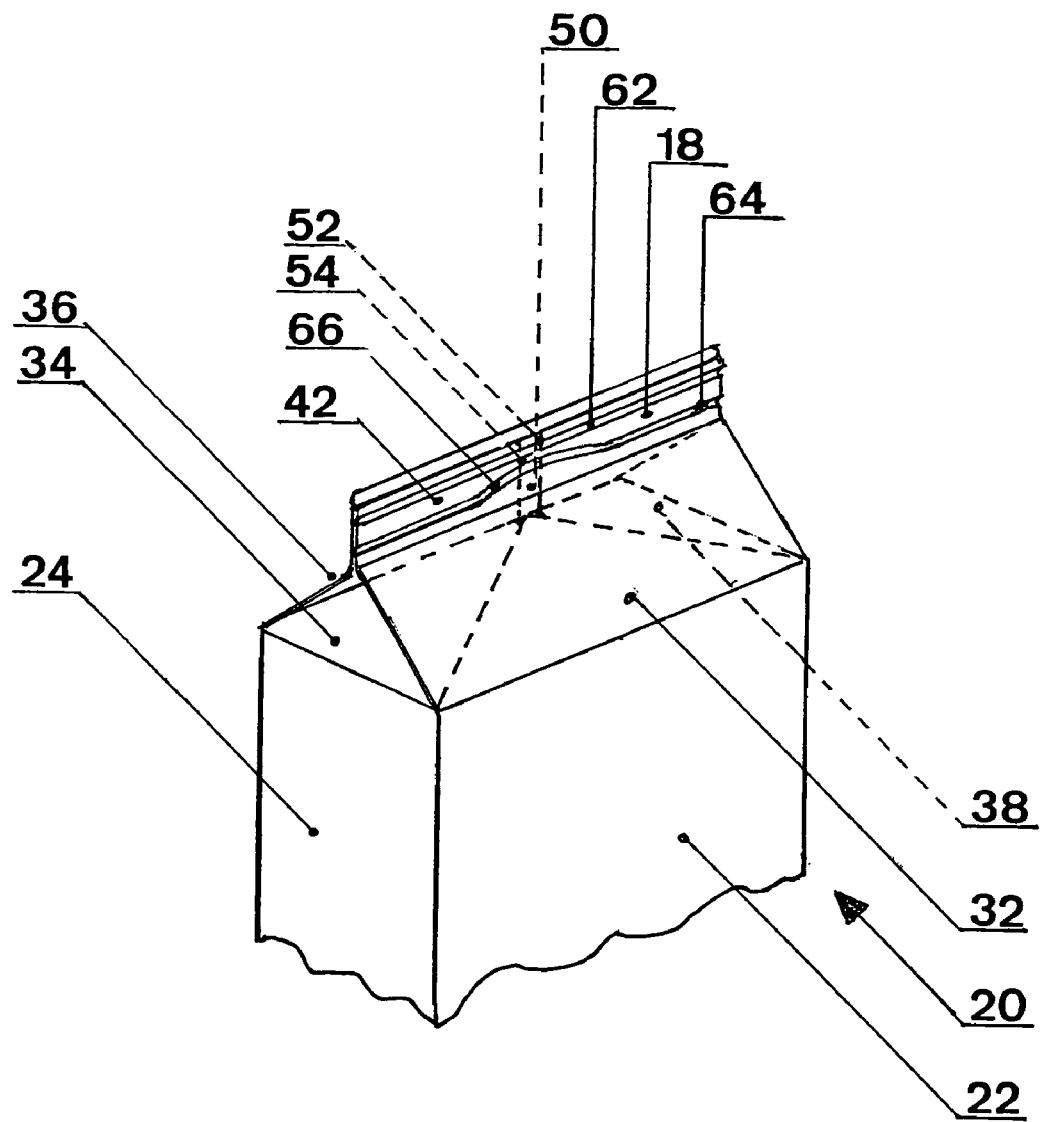
FIG. 5 is an isometric perspective view of an upper portion of a gable-top carton whereof the top fin has been sealed by the two jaws according to FIG. 1.

Referring to FIGS. 1 to 4, the two jaws for ultrasonic sealing consist of a jaw 2 constituting the outer end portion of an ultrasonic horn 4, and a jaw 6 constituting an anvil. The jaw 2 has an active sealing surface 8 which is planar, whilst the co-operating active sealing surface 10 of the anvil 6 is planar except for upper and lower ribs 12 and 14 each extending the length of the surface 10. The upper rib 12 is linear and horizontal, whilst the lower rib 14 is linear and horizontal except for an upwardly bowed middle portion 16 thereof.

The two jaws 2 and 6 serve to render gas-and-liquid tight a top fin 18 of a conventional gable-top carton 20 shown in FIG. 5. The carton 20 is made of a laminate including a paperboard substrate and innermost and outermost moisture barrier layers of thermoplastics, possibly with the interposition of an oxygen barrier layer of, for example, aluminium foil or ethylene vinyl alcohol (EVOH) between the paperboard layer and the innermost moisture barrier layer.

It will be understood that the carton 20 includes a loop of side panels 22,24, etc., a loop of top, obturating panels 32,34, 36,38, etc., and a loop of sealing panels 42, etc., providing the sealing fin 18. It will also be understood that the sealing fin 18 consists of two outer sealing panels (of which one is 42) and two inner sealing panels which are sandwiched between the outer sealing panels and each folded upon itself and which are so disposed between the two outer sealing panels as unwantedly to produce a central incipient channel 50 bounded by the two outer sealing panels and inwardly folded edges 52 and 54 of the respective inner sealing panels. It will also be understood that, upon clamping of the fin 18 between the jaws 2 and 6 for sealing of the fin, the ribs 12 and 14 produce in the outer surface of the sealing panel 42, as shown in FIG. 5, corresponding furrows 62 and 64, both of which extend over the whole length of the fin 18 at levels where the inner sealing panels are sandwiched between the outer sealing panels, so as to seal the top fin 18 in a gas- and liquid-tight manner along its whole length. The upwardly bowed middle portion 16 of the rib 14 produces a correspondingly upwardly bowed middle portion 66 of the furrow 64. The obturating panel 32 or 36 is provided with a pour spout fitment (not shown).

The upward bowing of the middle portion 66 of the furrow 64 has two advantages. The first is that it takes the sealing action of the rib 14 upwardly away from the lower ends of the edges 52 and 54, where the multi-plane folding of the laminate of the carton 20 is more likely to produce weaknesses in gas- and liquid-tightness of the carton 20 and so avoids exacerbating any such weaknesses through the application of sealing pressure to such weaknesses.

A second advantage is that the bowed middle portion 66 tends to displace upwardly towards the sealing furrow 62 innermost thermoplastics material of the laminate of the carton 20 in the region of that part of the incipient channel 50 directly above the portion 66, so that that material tends to be forced into the channel 50 at its section between the furrow 62 and the portion 66, so to promote gas- and liquid-tight sealing of that channel 50.

It will be appreciated that the system described with reference to the drawings is applicable also to a slant-top carton, as well as to a gable-bottom or slant-bottom carton.

The present system is particularly applicable where sealing of the sealing fin may have to be through liquid product residues remaining on the insides of the sealing panels of the fin after filling of the carton.

The invention claimed is:

1. A jaw for use in sealing of an end fin of a packaging carton, which fin comprises first and second outer sealing panels and first and second inner sealing panels which are sandwiched between said outer sealing panels and each folded upon itself and which are so disposed between said outer sealing panels as to produce a central incipient channel bounded by said outer sealing panels and inwardly folded edges of the respective inner sealing panels, said jaw comprising a sealing rib extending longitudinally of an active face of said jaw and comprising respective opposite end portions extending longitudinally of said active face and, between said end portions adapted to seal said central incipient channel transversely, a bowed middle portion, the arrangement being such that, during the sealing, the bowing of said middle portion is away from the middle of the carton, there being substantially no sealing protrusions to that side of said rib which, during the sealing, is towards the middle of the carton.

2. A jaw according to claim 1, and further comprising, to that side of the rib which, during the sealing, is away from the middle of the carton, a second sealing rib extending longitudinally of said active face and closely adjacent to said bowed middle portion.

3. A jaw according to claim 2, wherein said second sealing rib is substantially co-extensive with said the first-mentioned sealing rib longitudinally thereof.

4. A jaw according to claim 2, wherein said second sealing rib is rectilinear.

5. A jaw according to claim 1 and in the form of an anvil adapted to bear pressure produced by an ultrasonic sealing horn.

6. A method of sealing an end fin of a packaging carton, which fin comprises first and second outer sealing panels and first and second inner sealing panels which are sandwiched between said outer sealing panels and each folded upon itself and which are so disposed between said outer sealing panels as to produce a central incipient channel bounded by said outer sealing panels and inwardly folded edges of the respective inner sealing panels, comprising temporarily clamping said fin between sealing jaws and thereby forming, along said fin, a line of pressure and thereby a seal among said outer sealing panels and said inner sealing panels comprising respective opposite end portions extending longitudinally of said fin and, between said end portions, a middle portion bowed away from the middle of the carton, thereby promoting closure of said central incipient channel, the degree of sealing pressure produced by said clamping being greater than any produced by said jaws at any location between said line and the middle of said carton.

7. A method according to claim 6 and further comprising, simultaneously with said forming of said line, forming along said fin a second line of pressure extending closely adjacent to the first-mentioned line of pressure and among said outer sealing panels and said inner sealing panels, said second line of pressure being to that side of the first-mentioned line of pressure away from the middle of the carton.

8. A method according to claim 7, wherein said second line of pressure is formed substantially co-extensively with the first-mentioned line of pressure longitudinally thereof.

9. A method according to claim 7, wherein said second line of pressure is rectilinear.

10. A method according to claim 6, wherein said sealing is ultrasonic.

11. A method according to claim 10, wherein the or each line of pressure is produced by forming of a correspondingly shaped furrow in an outer surface of one of the outer sealing panels by a correspondingly shaped rib on an anvil co-operating with an ultrasonic horn.

12. A packaging carton including an end fin comprising first and second outer sealing panels and first and second inner sealing panels which are sandwiched between said outer sealing panels and each folded upon itself and which are so disposed between said outer sealing panels as to produce a central incipient channel bounded by said outer sealing panels and inwardly folded edges of the respective inner sealing panels, and a linear seal formed among said outer sealing panels and said inner sealing panels and comprising respective opposite end portions extending longitudinally of said fin and, between said end portions, a middle portion bowed away from the middle of the carton, whereby closure of said central incipient channel has been promoted, sealing tightness per unit area at said linear seal being greater than at any location between said linear seal and the middle of said carton.

13. A carton according to claim 12, and further comprising a second linear seal formed, among said outer sealing panels and said inner sealing panels, along said fin and extending closely adjacent to the first-mentioned linear seal, said second linear seal being located to that side of the first-mentioned linear seal away from the middle of said carton.

14. A carton according to claim 3, wherein said second linear seal is substantially co-extensive with the first-mentioned linear seal longitudinally thereof.

15. A carton according to claim 14, wherein said second linear seal is rectilinear.

16. A carton according to claim 12 and further comprising a pour spout fitment.

* * * * *